United States Patent [19]

Green

[11] 4,152,877

[45] May 8, 1979

[54] WALL REPAIR CLIP

[76] Inventor: Leonard O. Green, 620 E. Pine, Santa Ana, Calif. 92701

[21] Appl. No.: 918,762

[22] Filed: Jun. 26, 1978

[51] Int. Cl.² ............................................. E04G 23/02
[52] U.S. Cl. ................................... 52/514; 24/85 C; 52/127; 52/509
[58] Field of Search ................ 52/514, 127, 509, 743, 52/746; 156/71, 94; 428/63; 24/85 C, 73 C, 86 C

[56] References Cited

U.S. PATENT DOCUMENTS

| 1,873,292 | 8/1932 | Collins | 24/73 C |
|---|---|---|---|
| 2,688,171 | 9/1954 | Anderson | 24/85 C |
| 2,697,262 | 12/1954 | Olsen | 24/73 C X |
| 2,910,155 | 10/1959 | Bradner | 52/509 |
| 3,213,582 | 10/1965 | Reed | 52/509 |
| 3,226,893 | 1/1966 | Mitchell | 52/514 X |
| 3,289,374 | 12/1966 | Metz | 52/514 |
| 3,858,364 | 1/1975 | Proulx | 52/127 |
| 3,995,404 | 12/1976 | Thaw | 52/514 |
| 3,999,347 | 12/1976 | Devlin | 52/514 |

*Primary Examiner*—J. Karl Bell
*Attorney, Agent, or Firm*—William C. Babcock

[57] ABSTRACT

A wire clip conformed as a Z-shaped, planar wire platform, one end of the Z being bent out of the plane to form an insertable point to provide support for plaster patches. A stiff backing surface may thus be supported by the clips inserted at various points along the edges of the hole to be patched, the clips and the backing surface providing the necessary structure onto which the repair plaster may be accumulated.

3 Claims, 5 Drawing Figures

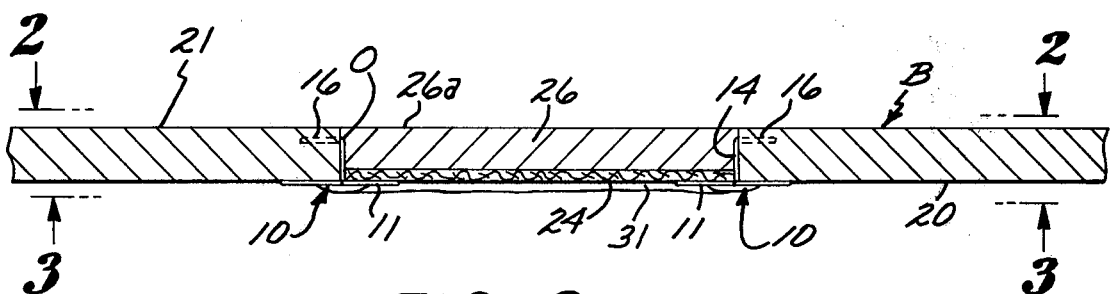
FIG. 1
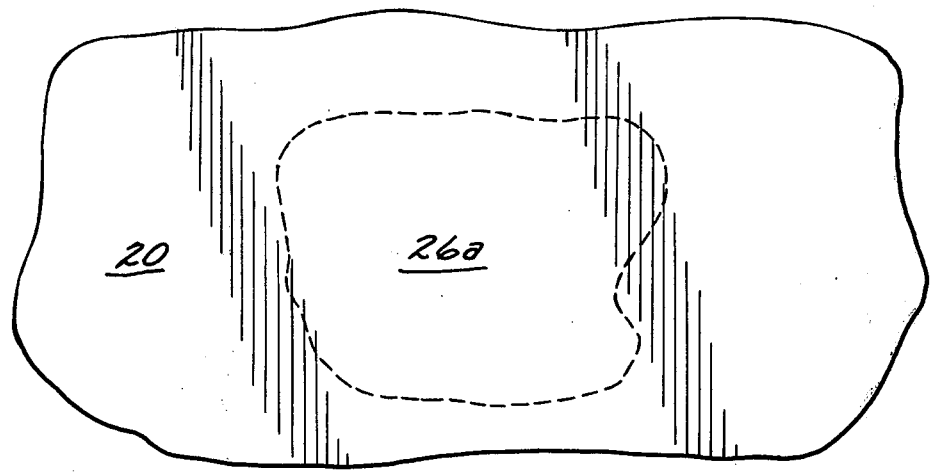
FIG. 2
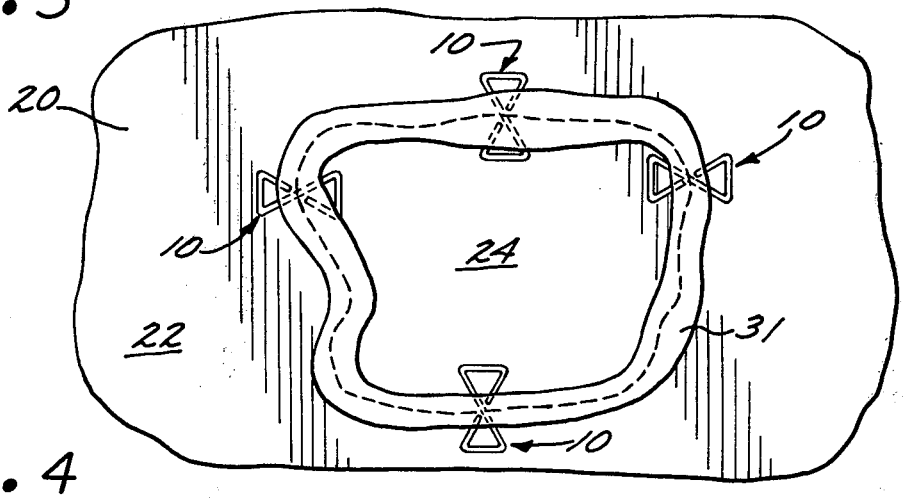
FIG. 3
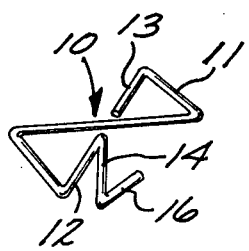
FIG. 4
FIG. 5

WALL REPAIR CLIP

BACKGROUND OF THE INVENTION

1. Field of the Invention

The present invention relates to wall repair devices, and more particularly to clips for providing edge support in breaks in plaster walls.

2. Description of the Prior Art

One advantage of plaster walls or walls made out of wall board (sometimes referred to as dry wall) is the convenience with which repairs can be effected therein. Most frequently it is fractures in the form of cracks or breaks that are repaired. Occasionally, however, damage greater than simple cracks is experienced, and open areas of wall require repair often larger than the spread achievable in wet plaster. In those instances there have been various techniques developed in the past for providing support to the wet plaster patch. Most frequently those techniques entailed the fitting of plaster board patches or the use of paper or cardboard fillers which are then adhered to the edges of the opening. In each instance the inconvenience of initially maintaining the support in position has been recognized and fastenings therefor have been developed. These prior art fastenings, typically, entail complex structure, increasing cost to the user and requiring substantial skills.

SUMMARY OF THE INVENTION

Accordingly it is the general purpose and object of the present invention to provide a patch support fastener which is easy to produce, convenient in use and simple in structure.

Other objects of the invention are to provide a patch support clip made out of a wire element which provides the requisite edge attachment for effecting repair of plaster walls.

Yet further objects of the invention are to provide a wall repair clip which by virtue of its structure is easy to produce, and convenient in use.

Briefly these and other objects are accomplished within the present invention by conforming a wire element in the manner of a Z, one end of the Z extending toward the center thereof to support a normally projecting segment which at the end is bent over for insertion into the edges of an opening formed in a wall. When installed the surface defined by the Z portion of the clip provides an overlapping structure extending into the opening, and it is on this structure that cardboard or other relatively rigid backing may be supported. The repair plaster is then deposited onto this backing surface, permeating through the edge gap to surround the clip as it is built up to effect the repair.

The additional feature of the foregoing device is the convenience within which various wall thicknesses can be accommodated. More specifically the insertable end can be spaced, within the limits of the structure, to various dimensions of separation from the plane of the Z, thus accommodate any desired wall thicknesses.

BRIEF DESCRIPTION OF THE DRAWINGS

FIG. 1 is a sectional view of a plaster wall having embedded therein a plurality of the inventive clips to support a patch;

FIG. 2 is a front view of the plaster walls shown in FIG. 1, taken along Line 2—2 of FIG. 1;

FIG. 3 is a back view taken along Line 3—3 of FIG. 1;

FIG. 4 is a perspective illustration of the inventive clip useful in the patching structure shown in FIGS. 1 through 3; and FIG. 5 is a side view of the clip shown in FIG. 4.

DESCRIPTION OF THE SPECIFIC EMBODIMENT

As shown in FIGS. 1 through 5 an opening O in the plaster wall D may be patched by depositing on a backing surface 24, of stiff material like cardboard or other fibrous structure, a layer of plaster 26 which is built up to the exterior surface 21 of the wall. More specifically the backing surface 24 is generally shaped to conform to the interior dimensions of the opening O and is supported in alignment with the rear surface 20 of wall B by a plurality of inventive clips, each generally designated by the numeral 10. Each clip 10 comprises a length of wire conformed to define a planar surface achieved by the bending thereof into a Z shaped structure 11, the ends of the Z 12 and 13 respectively being turned back towards the center. This bent over structure is essentially planar, the end 12 being furthermore bent over to extend in an orthogonal segment 14 which proximate the end thereof is once more bent over to form a piercing segment 16 aligned substantially parallel to the plane of the Z. This piercing end segment 16 is insertable into the edges of the opening O, the Z structure 11 being aligned adjacent the back surface 20 of the wall B. In this form part of the clip 10 extends into the interior of opening O providing the support for the aforementioned backing surface 24.

By selective engagement of a plurality of clips 10 at various points of the periphery of the opening O sufficient structural support may be achieved for the backing surface. Furthermore by selective location of the inventive clips 10 points of minimal clearance may be secured, the backing surface being bent around the vertical segment to further insure temporary attachment. Once the clips thus locate the backing surface 24 the patching plaster 26 may be deposited there on. The structural regidity of the backing surface provides the necessary support for adhesive contact to support the wet plaster from sagging. The wet plaster 26 can then be built up to a surface 26a which coincides with the exterior surface 21 of the wall B, completing the repair. When this process is executed some of the plaster will permeate the gap between the edges of the backing surface 24, and the opening O to form an overlapping bead 31 on the back surface, bead 31 partly surrounding the exposed clip segment and further insuring a rigid bond with the wall.

It is to be noted that the foregoing structure can be easily manufactured by convolving wire elements. In this regard the same economies of a manufacture achieved with a paperclip may be achieved in this device. Furthermore, similar to a paperclip, the foregoing device may be manually modified to accommodate various wall irregularties. For example the end segment 12 may be bent out of the plane of the Z shaped structure to either decrease or increase the separation of the insertable end segment 16.

Obviously many modifications and variations to the above disclosure can be made without departing from the spirit of the invention. It is therefore intended that the scope of the invention be determined solely on the claims appended hereto.

What is claimed is:

1. Apparatus for supporting a plaster patch in a plaster wall comprising:
a wire clip convolved by bending to form a Z shaped substantially planar structure, one end of said Z shaped structure extending in an orthogonal segment aligned substantially normal to the plane thereof, the end of said orthogonal segment being bent to form a wall piercing segment directed substantially parallel to the plane of said Z shaped structure.

2. Apparatus according to claim 1 wherein:
said orthogonal segment is aligned substantially central relative said Z shaped structure.

3. A method of effecting repairs in a plaster wall comprising the steps of:
inserting a plurality of wire clips each convolved by bending to form a Z shaped substantially planar structure, one end of said Z shaped structure extending in an orthogonal segment aligned substantially normal to the plane thereof, the end of said orthogonal segment being bent to form a wall piercing segment directed substantially parallel to the plane of said Z shaped structure into the edges of said plaster wall;
supporting a rigid backing surface on said clips; and
depositing wet plaster on said backing surface.

* * * * *